United States Patent
Sobel et al.

(10) Patent No.: US 8,909,845 B1
(45) Date of Patent: Dec. 9, 2014

(54) SYSTEMS AND METHODS FOR IDENTIFYING CANDIDATE DUPLICATE MEMORY PAGES IN A VIRTUAL ENVIRONMENT

(75) Inventors: William E. Sobel, Jamul, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 511 days.

(21) Appl. No.: 12/946,118

(22) Filed: Nov. 15, 2010

(51) Int. Cl.
G06F 9/455 (2006.01)
G06F 3/06 (2006.01)

(52) U.S. Cl.
CPC .......... *G06F 9/45558* (2013.01); *G06F 3/0608* (2013.01); *G06F 2009/45583* (2013.01); *G06F 3/0676* (2013.01); *G06F 3/0641* (2013.01)
USPC .............................................. 711/6; 711/154

(58) Field of Classification Search
CPC ............................................. G06F 2009/45583
See application file for complete search history.

(56) References Cited

U.S. PATENT DOCUMENTS

| | | | |
|---|---|---|---|
| 6,789,156 B1 * | 9/2004 | Waldspurger | 711/6 |
| 7,500,048 B1 * | 3/2009 | Venkitachalam et al. | 711/6 |
| 7,925,850 B1 * | 4/2011 | Waldspurger et al. | 711/162 |
| 8,706,947 B1 * | 4/2014 | Vincent | 711/6 |
| 2008/0005489 A1 * | 1/2008 | Watkins et al. | 711/147 |
| 2009/0049271 A1 * | 2/2009 | Schneider | 711/206 |
| 2009/0204718 A1 * | 8/2009 | Lawton et al. | 709/230 |
| 2010/0161879 A1 * | 6/2010 | Nation et al. | 711/103 |
| 2010/0161908 A1 * | 6/2010 | Nation et al. | 711/147 |
| 2010/0223432 A1 * | 9/2010 | Eidus et al. | 711/148 |
| 2011/0099318 A1 * | 4/2011 | Hudzia et al. | 711/6 |
| 2012/0011508 A1 * | 1/2012 | Ahmad | 718/1 |
| 2012/0066466 A1 * | 3/2012 | Choi et al. | 711/162 |
| 2012/0137045 A1 * | 5/2012 | Bacher et al. | 711/6 |

OTHER PUBLICATIONS

Jacob Faber Kloster et al. "Efficient Memory Sharing in the Xen Virtual Machine Monitor." Jan. 2006. Technical report. Aalborg University. pp. 59-72.*
Diwaker Gupta et al. "Difference Engine: Harnessing Memory Redundancy in Virtual Machines." Dec. 2008. USENIX. OSDI '08. pp. 309-322.*
Andrea Arcangeli et al. "Increasing memory density by using KSM." Jul. 2009. Proceedings of the Linux Symposium. pp. 19-28.*

* cited by examiner

*Primary Examiner* — Nathan Sadler
(74) *Attorney, Agent, or Firm* — Holland & Hart LLP

(57) ABSTRACT

A computer-implemented method to identify candidate duplicate memory pages in a virtual environment is described. At least one memory page in memory is analyzed. The at least one memory page is associated with an application executing in a virtual machine. Information for the at least one memory page in memory is collected when the at least one memory page is identified as being a candidate duplicate memory page. The information identifies the application associated with the at least one memory page. A report is generated that includes the collected information for the at least one memory page.

14 Claims, 9 Drawing Sheets

SYSTEMS AND METHODS FOR IDENTIFYING CANDIDATE DUPLICATE MEMORY PAGES IN A VIRTUAL ENVIRONMENT

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many businesses use one or more computer networks to communicate and share data between the various computers connected to the networks. The productivity and efficiency of employees often require human and computer interaction. Users of computer technologies continue to demand that the efficiency of these technologies increase. Improving the efficiency of computer technologies is important to anyone who uses and relies on computers.

Improvements to the efficiency of computing technologies has introduced the concept of virtual machines. The concept of virtual machines allows the sharing of the underlying physical machine resources between different virtual machines, each virtual machine running its own operating system. A software layer providing the virtualization is often referred to as a virtual machine monitor or a hypervisor. Virtual machines allow for multiple operating system environments to co-exist on the same computing device. These multiple operating system environments are often in strong isolation from each other. In addition, virtual machines may provide an instruction set architecture (ISA) that may be different from that of the real physical machine.

Virtual machines, however, may be less efficient than a real physical machine when they access the underlying hardware indirectly. Further, when multiple virtual machines are concurrently running on the same physical machine, each virtual machine may exhibit a varying and unstable performance. For example, applications running on multiple virtual machines may be associated with identical memory pages stored in the memory of the real physical machine. The efficiencies of the virtual machines (and the real physical machine) may decline because of the inefficient allocation of the memory. As a result, benefits may be realized by providing improved systems and methods for identifying candidate duplicate memory pages in a virtual environment.

SUMMARY

According to at least one embodiment, a computer-implemented method to identify candidate duplicate memory pages in a virtual environment is described. At least one memory page in memory is analyzed. The at least one memory page is associated with an application executing in a virtual machine. Information for the at least one memory page in memory is collected when the at least one memory page is identified as being a candidate duplicate memory page. The information identifies the application associated with the at least one memory page. A report is generated that includes the collected information for the at least one memory page.

In one embodiment, the report is transmitted to a managing module configured to manage at least one resource of a computing device for one or more virtual machines executing on the computing device. An order of memory pages in the memory is prioritized based on the report. The memory pages in the memory may be scanned according to the prioritized order of the memory pages. In one example, deduplication techniques may be performed when a scanned memory page is a duplicate memory page.

In one configuration, the report may include a globally unique identifier (GUID) that identifies an entity that generated the report. A determination may be made as to whether a threshold quantity of reports that identify the application associated with a candidate duplicate memory page have been received from a threshold number of entities with the GUID.

In one example, the collected information in the report may be logged. The logged information may be accessed to determine whether multiple entities have identified an identical type of memory page as being a candidate duplicate memory page. In one embodiment, a memory page may be tagged when the memory page is a candidate duplicate memory page.

A computing device configured to identify candidate duplicate memory pages in a virtual environment is also described. The device includes a processor and memory in electronic communication with the processor. The device may further include an indicating application configured to analyze at least one memory page in memory. The at least one memory page may be associated with an application executing in a virtual machine. The indicating application may be further configured to collect information for the at least one memory page in memory when the at least one memory page is identified as being a candidate duplicate memory page. The information may identify the application associated with the at least one memory page. The indicating application may also be configured to generate a report that includes the collected information for the at least one memory page.

A computer-program product for identifying candidate duplicate memory pages in a virtual environment is also described. The computer-program product may include a computer-readable medium having instructions thereon. The instructions may include code programmed to analyze at least one memory page in memory. The at least one memory page may be associated with an application executing in a virtual machine. The instructions may further include code programmed to collect information for the at least one memory page in memory when the at least one memory page is identified as being a candidate duplicate memory page. The information may identify the application associated with at least one memory page. The instructions may further include code programmed to generate a report that includes the collected information for the at least one memory page.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
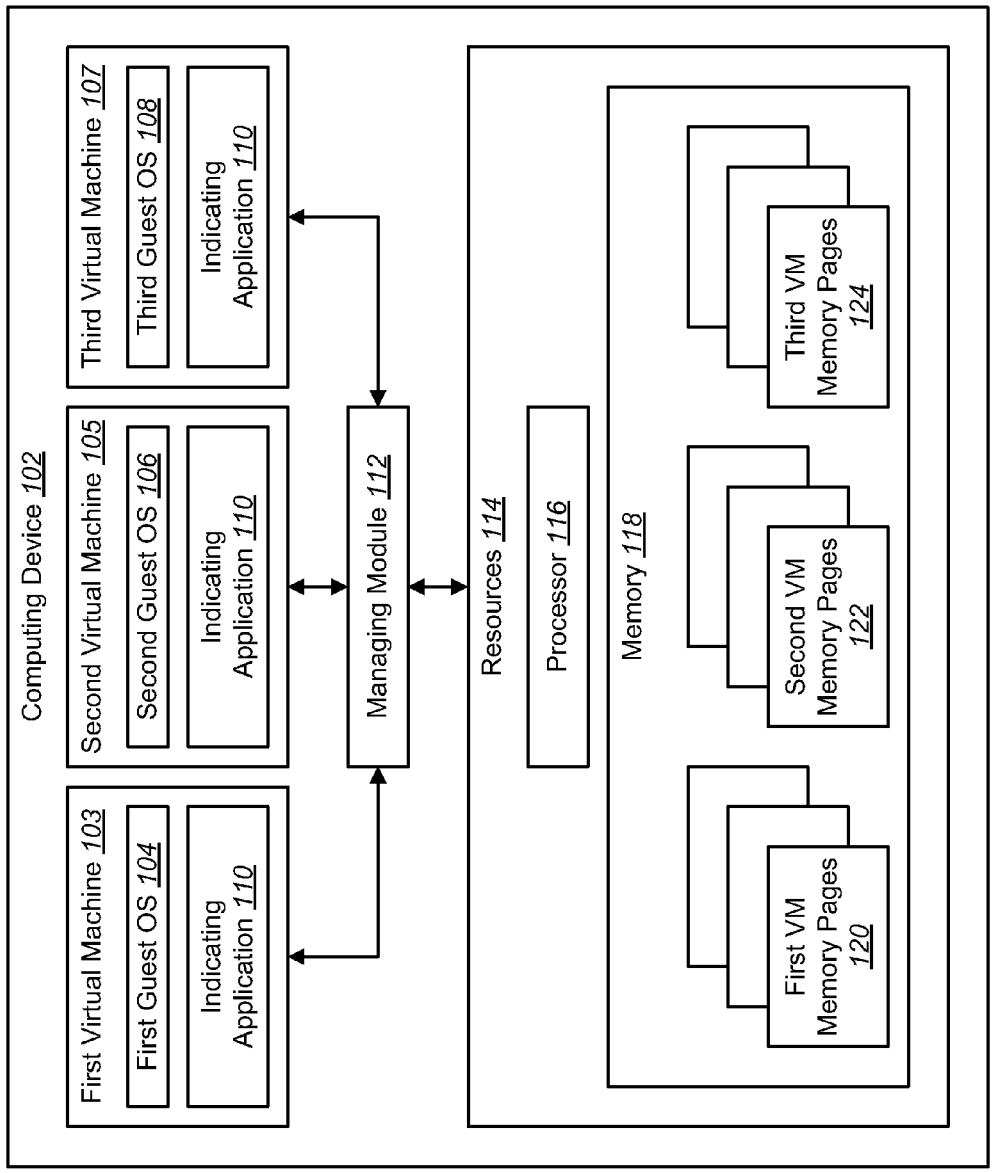
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In computing, a host operating system (OS) may be the original OS installed on a computing device. Other operating systems, in addition to the host OS, may also be installed on the computing device. These additional operating systems may be referred to as guest operating systems. Each of these guest operating systems may be executed in an isolated partition within the computing device. The isolated partitions running an instance of a guest operating system may be referred to as virtual machines. A guest OS may execute one or more applications in a virtual machine (VM). The process of configuring an OS to operate as a guest OS in a VM environment may be referred to a paravirtualization.

A hypervisor (also referred to as a virtual machine monitor) may allow the guest operating systems to run concurrently on the computing device. Each guest OS may perceive to have the resources (e.g., processor, memory, etc.) of the computing device all to itself. As a result, a guest OS may not be aware of other guest operating systems that are operating on the computing device. The hypervisor may manage and control the resources of the computing device, allocating the resources that are needed to each guest OS so that the guest operating systems do not disrupt each other.

Each VM may use a certain portion of memory in the computing device. Because the virtual machines are not aware of each other, one VM may store data in memory of the computing device that are identical to data stored in memory by other virtual machines. For example, a first guest OS may execute an anti-virus detection application in a first VM. A second guest OS may also execute the anti-virus detection application in a second VM. As a result, memory pages for the first VM and memory pages for the second VM may store identical data relating to the anti-virus detection application.

In one example, the hypervisor may implement memory scavenging schemes to attempt to recognize duplicate memory pages for applications running in multiple virtual machines. The hypervisor may then execute deduplication processes to eliminate the duplicate memory pages. Deduplication is a technology in which stored data may be reduced by removing redundant data (either on a block basis or on larger segments of data such as files). Common segments of data may be merged (in a copy-on-write "CoW" fashion). This may free up space in memory for other uses. Current memory scavenging schemes to locate and identify duplicate memory pages, however, may vary widely in their effectiveness and speed.

In addition, a VM may migrate from one physical server to another physical server across a wide area network (WAN). Current techniques to migrate a VM across a WAN may be hindered, however, because of the need to transfer large quantities of memory pages associated with the VM from one server to the other server.

In one embodiment, the present systems and methods may increase the speed and accuracy of memory page deduplication with the active participation of an indicating application executing in each VM on a computing device. In one configuration, the present systems and methods may allow the indicating application to provide indications to the hypervisor as to which memory pages are likely to be duplicated across applications running in multiple virtual machines. Given such guidance, hypervisors may quickly and aggressively reclaim duplicate memory pages and reduce physical memory utilization. By reducing physical memory utilization, the present systems and methods may accelerate the migration of a VM across a WAN or the Internet.

As explained above, paravirtualization approaches may allow for efficient utilization of computing resources by explicit cooperation between a guest operating system and the hypervisor. In one example, explicit cooperation between applications (and guest operating systems) running on virtual machines may be exploited to improve the efficiency, accuracy, and speed of memory deduplication. In one configuration, deduplication processes may arrange memory so that it is optimized for page level deduplication by aligning it on page size boundaries, placing the read-only blocks together, and separating out fields that are likely to change in separate pages, zeroing unused blocks (zeroed blocks may be coalesced even further), etc. In addition to the aforementioned deduplication processes, the present systems and methods may allow an indicating application to call out the blocks of memory that are then likely to be the same in instances of the same application in other virtual machines. Identifying the duplicate memory pages of applications running in multiple virtual machines may increase the efficiency to migrate or propagate virtual machines across a WAN. In one example, WAN accelerators for virtual machine migration may deduplicate memory pages of applications to recreate virtual machine states more efficiently using the present systems and methods.

While existing hypervisors, such as Vmware, include memory deduplication, currently each VM may be treated the same. As a result, the hypervisor currently searches every memory page for each VM to locate duplicate memory pages for applications running in multiple virtual machines. This process may be done as a background process and a consequential amount of time may elapse before memory pages are found that match. The present systems and methods accelerate this process. As previously explained, the present systems and methods may utilize an indicating application running on each VM that identifies to the hypervisor candidate pages of memory that are likely to be duplicated. When identifying the candidate pages, the indicating application may identify itself to the hypervisor with a GUID. In one embodiment, the hypervisor may quickly establish whether or not identified candidate pages of memory across multiple virtual machines may be deduplicated and collapsed into copy-on-right shared memory when the hypervisor recognizes the same application GUID identifying pages across multiple virtual machines that are highly likely to be duplicated.

FIG. 1 is a block diagram illustrating one embodiment of an environment in which the present systems and methods may be implemented. In one configuration, a computing device 102 may include one or more isolated partitions or virtual machines 103, 105, 107. Each VM 103, 105, 107 may include a guest OS 104, 106, 108. The guest operating systems 104, 106, 108 may share resources 114 of the computing device 102. For example, the guest operating systems may use a processor 116 and memory 118 of the computing device 102. A managing module 112 may allocate the usage of the resources 114 to the various guest operating systems 104, 106, 108. In one embodiment, the managing module 112 may be a hypervisor, a virtual machine monitor, and the like.

In one configuration, the memory 118 may store memory pages 120, 122, 124 for each VM 103, 105, 107. In one embodiment, each guest OS 104, 106, 108 may execute one or more applications. For example, the guest operating systems 104, 106, 108 may execute an indicating application 110. The indicating application 110 may analyze the memory pages 120, 122, 124 and provide information regarding the memory pages to the managing module 112. The memory pages 120, 122, 124 may store data corresponding to applications running on each VM 103, 105, 107. In one embodiment, the first VM memory pages 120 may store data relating to one or more applications running on the first VM 103. Similarly, the second VM memory pages 122 and the third VM memory pages 124 may store data relating to one or more applications running on the second VM 105 and the third VM 107, respectively.

In one configuration, the indicating application 110 executing on the first VM 103 may analyze first VM memory pages 120, the indicating application 110 executing on the second VM 105 may analyze second VM memory pages 122, and the indicating application 110 executing on the third VM 107 may analyze third VM memory pages 124. In one configuration, the indicating application 110 may identify memory pages 120, 122, 124 that have a likelihood of being duplicate memory pages. The indicating application 110 may report this information to the managing module 112.

Figure 2:
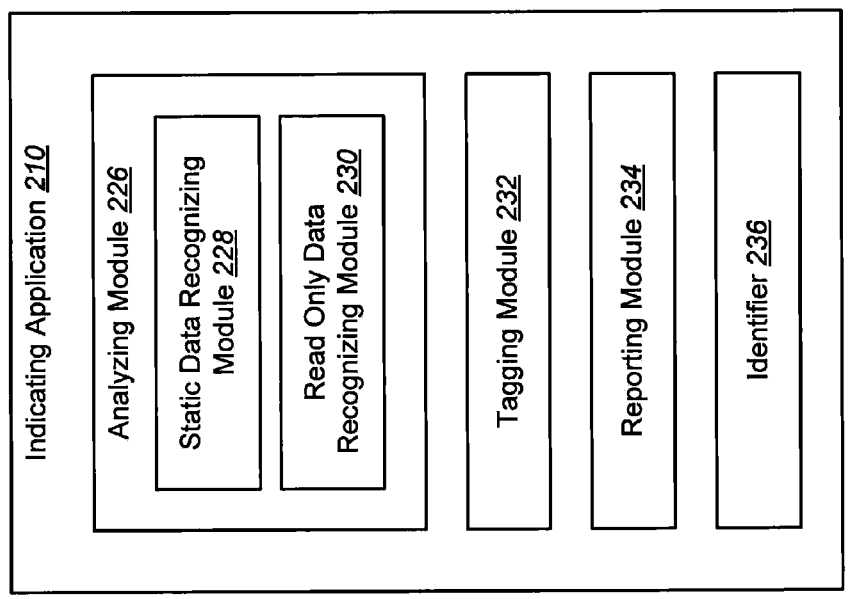
FIG. 2 is a block diagram illustrating one embodiment of an indicating application in accordance with the present systems and methods.

FIG. 2 is a block diagram illustrating one embodiment of an indicating application 210 in accordance with the present systems and methods. In one embodiment, the indicating application 210 may include an analyzing module 226, a tagging module 232, a reporting module 234, and an identifier 236.

In one embodiment, the analyzing module 226 may include a static data recognizing module 228 and a read only data recognizing module 230. In one configuration, the analyzing module 226 may analyze memory pages associated with a VM. The static data recognizing module 228 may determine whether a particular memory page includes data that are static, includes data that have a low likelihood of being changed or altered, and the like. If a memory page includes data that are static, the analyzing module 226 may determine that the memory page has a high likelihood of being a duplicate memory page. If the static data recognizing module 228 does not recognize static data in the analyzed memory page, the analyzing module 226 may determine that the memory page has a lower likelihood of being a duplicate memory page.

In one configuration, the read only data recognizing module 230 may determine whether a memory page includes read only data. In one example, read only data may be classified as data that have a low likelihood of being changed or altered. If the read only data recognizing module 230 identifies read only data on a memory page, the analyzing module 226 may determine that the memory page has a high likelihood of being a duplicate memory page. Conversely, if the read only data recognizing module 230 determines that the memory page does not include read only data, the analyzing module 226 may determine that the memory page has a lower likelihood of being a duplicate memory page.

In one configuration, the tagging module 232 may tag or otherwise identify a memory page that has a high likelihood of being a duplicate memory page. For example, the indicating application 210 may execute on the first VM 103 and may analyze a first VM memory page 120. The first VM memory page 120 may include data relating to an anti-virus detection application executing on the first VM 103. The anti-virus detection application may also be executed on the second VM 105 and/or the third VM 107. As a result, a second VM memory page 122 and/or a third VM memory page 124 may include data that are identical to the data of the first VM memory page 120. The analyzing module 226 may determine that the first VM memory page 120 has a high likelihood of being a duplicate memory page across applications running on multiple virtual machines. The tagging module 232 may tag (or otherwise identify) the analyzed memory page (e.g., the first VM memory page 120) as having a high likelihood of being a duplicate memory page.

The reporting module 234 may collect or create a list of tagged memory pages that a have a likelihood of being duplicate memory pages across the various virtual machines executing on the client computing device 102. In one example, the indicating application 110 may be assigned an identifier 236. For example, the identifier 236 may be a GUID assigned to the indicating application 110. The reporting module 234 may generate a report that includes the tagged memory pages that have a high likelihood of being a duplicate memory page along with the identifier 236 of the indicating application 210. The report may be provided to the managing module 112.

Figure 3:
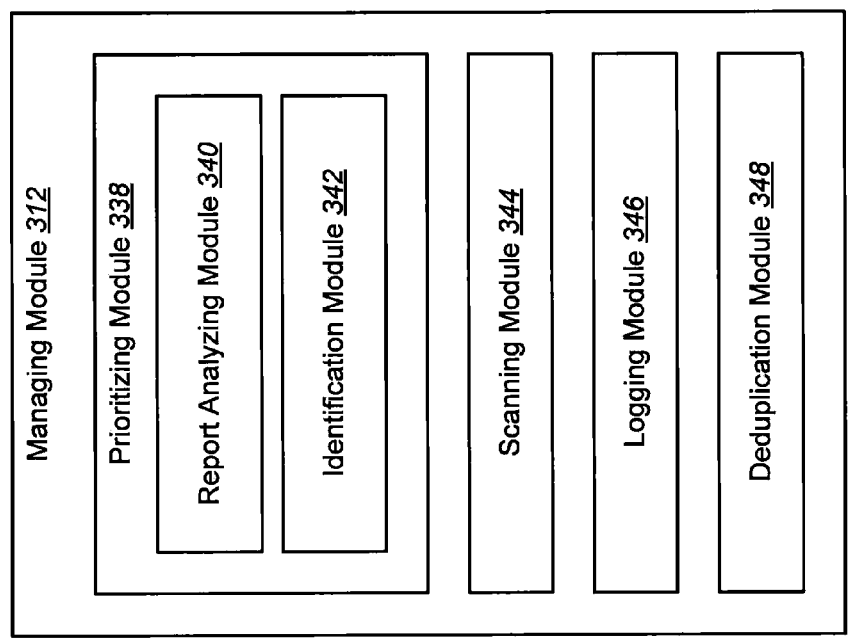
FIG. 3 is a block diagram illustrating one embodiment of a managing module in accordance with the present systems and methods.

FIG. 3 is a block diagram illustrating one embodiment of a managing module 312 in accordance with the present systems and methods. In one embodiment, the managing module 312 may include a prioritizing module 338, a scanning module 344, a logging module 346, and a deduplication module 348.

In one configuration, the prioritizing module 338 may include a report analyzing module 340 that analyzes the report received from the indicating application 110. Based on the analysis of the report, the prioritizing module 338 may use an identification module 342 to identify the memory pages included in the report that have a high likelihood of being duplicate memory pages. The prioritizing module 338 may then prioritize the identified memory pages in a particular order and the scanning module 344 may scan the memory pages in this order. The scanning module 344 may scan the identified memory pages to determine whether a particular memory page is a duplicate memory page. For example, the scanning module 344 may scan a first memory page corresponding to the first VM 103. The scanning module 344 may then scan a memory page corresponding to the second VM 105 and/or the third VM 107. The scanning module 344 may then determine whether the scanned memory pages are duplicates with each other. The deduplication module 348 may execute a deduplication process if it is determined by the scanning module 344 that duplicate memory pages exist in the memory 118.

In one embodiment, the logging module 346 may log information in tags associated with the memory pages. For example, the logging module 346 may log information regarding the types of memory pages identified by the indicating application 110. The managing module 312 may access the logged information to determine whether multiple virtual machines have identified the same type of memory page as having a high likelihood of being a duplicate memory page in memory 118.

Figure 4:
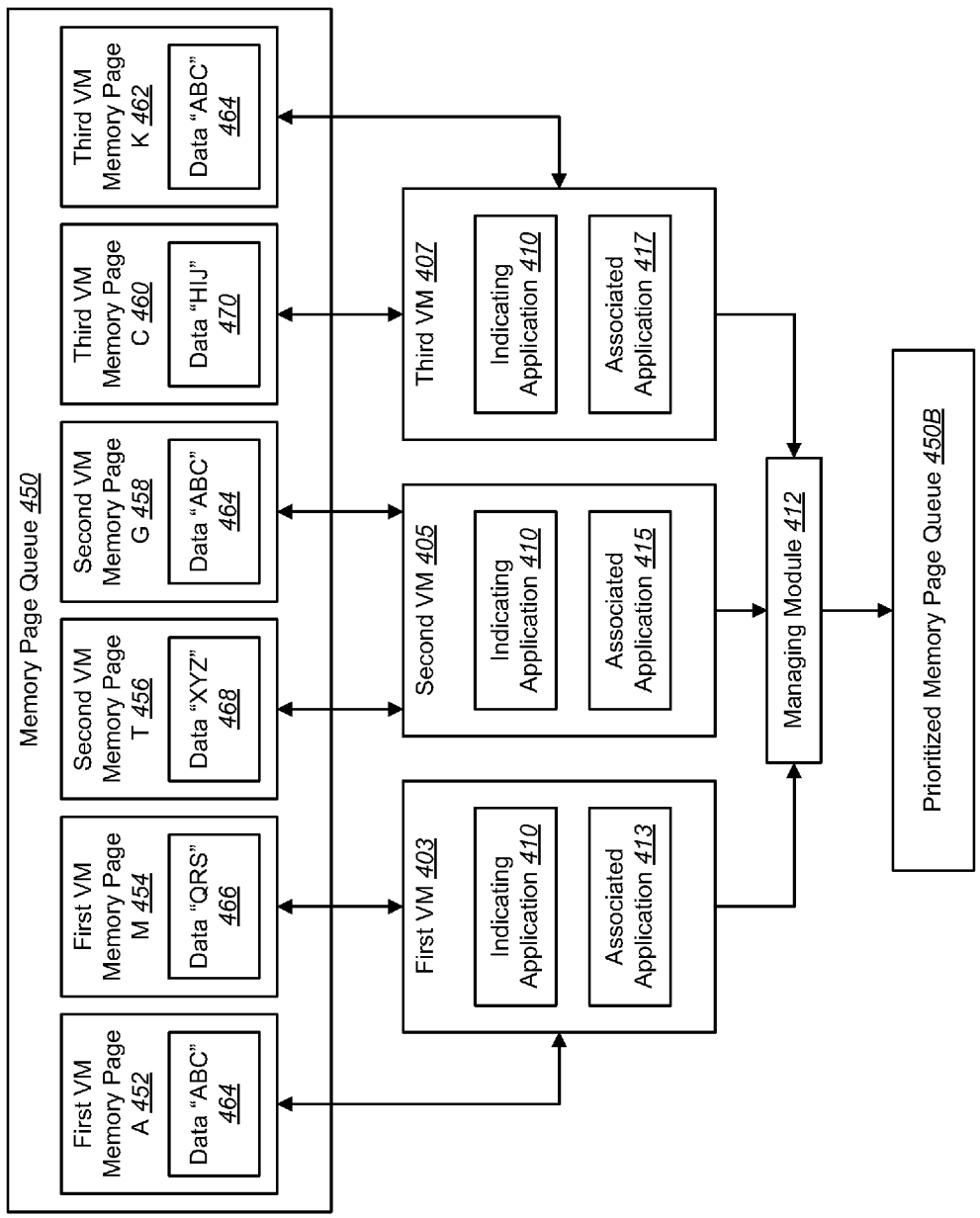
FIG. 4 is a block diagram illustrating one embodiment of an non-prioritized memory page queue.

FIG. 4 is a block diagram illustrating one embodiment of an non-prioritized memory page queue 450. In one example, the non-prioritized queue 450 may include various memory pages corresponding to applications running on multiple virtual machines.

In one embodiment, the non-prioritized memory page queue 450 may include first VM memory pages 452, 454 corresponding to a first VM 403. The non-prioritized memory page queue 450 may also include second VM memory pages 456, 458 corresponding to a second VM 405. In addition, the non-prioritized memory page queue 450 may include third VM memory pages 460, 462 corresponding to a third VM 407. As previously explained, the first VM 403, the second VM 405, and the third VM 407 may include guest operating systems that execute an indicating application 410 in accordance with the present systems and method. The VMs 403, 405, and 407 may also include associated applications 413, 415, and 417, respectively, each an application associated with at least one of the depicted memory pages. A managing module 412 may manage the resources 114 of a client device 102 in which the various virtual machines 403, 405, 407 are operating. The managing module 412 may be connected to a prioritized memory page queue 450B. Details of the prioritized memory page queue 450B are discussed in greater detail below with reference to the prioritized memory page queue 550 of FIG. 5.

Each memory page in the non-prioritized memory page queue 450 may include a particular piece of data. For example, the first VM memory page A 452 may include the data "ABC" 464. The second VM memory page G 458 and the third VM memory page K 462 may also include data "ABC" 464. As a result, each VM 403, 405, 407 may be associated with a memory page that includes the data "ABC" 464. Additionally, the first VM memory page M 454 may include the data "ORS" 466, the second VM memory page T 456 may include data "XYZ" 468, and the third VM memory page C 460 may include data "HIJ" 470. The indicating application 410 running on each guest operating system in each VM may analyze the various memory pages in the non-prioritized memory page queue 450. The indicating application 410 may identify (or tag) the memory pages that have a high likelihood of being duplicate memory pages. In this example, the indicating application 410 may identify (or tag) the first VM memory page A 452, the second VM memory page G 458, and the third VM memory page K 462 because each of these memory pages include the identical data "ABC" 464.

The indicating application 410 may generate and provide a report to the managing module 412 that identifies the memory pages that have a high likelihood of being duplicate memory pages. The managing module 412 may use the report provided by the indicating application 410 to generate a prioritized memory page queue 550. Details regarding the prioritized memory page queue 550 will be described below.

Figure 5:
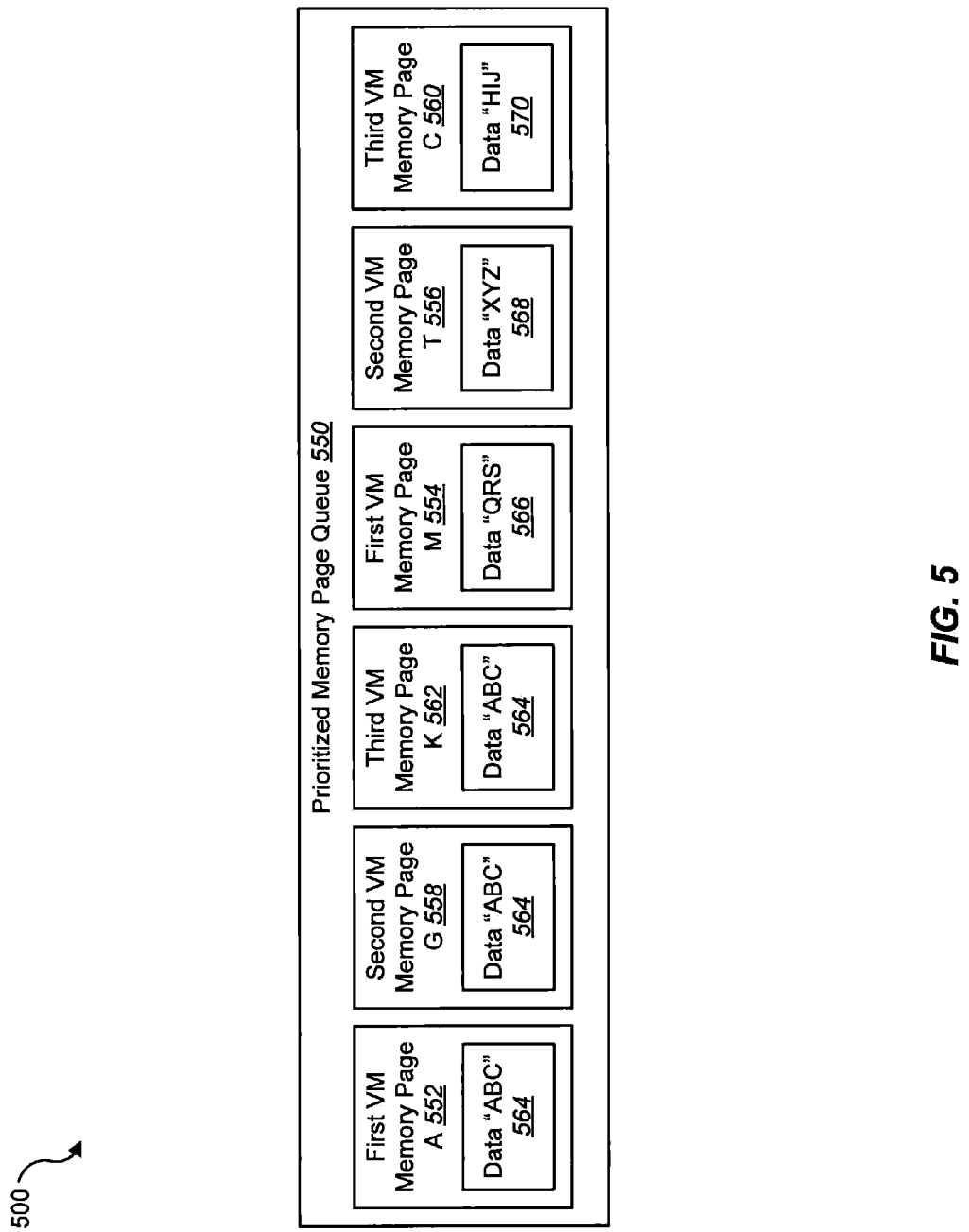
FIG. 5 is a block diagram illustrating one embodiment of a prioritized memory page queue.

FIG. 5 is a block diagram illustrating one embodiment of a prioritized memory page queue 550. The managing module 112 may use a report provided by the indicating application 110 to prioritize the order of memory pages within the prioritized memory page queue 550. In this example, following from the example provided in FIG. 4, the first memory pages in the prioritized memory page queue 550 may be the first VM memory page A 552, the second VM memory page G 558, and the third VM memory page K 562. These memory pages, 552, 558, 562 may be placed at the beginning of the prioritized memory page queue 550 so that the scanning module 344 may scan these memory pages 552, 558, 562 first before the other memory pages in the queue 550. Additionally, the first VM memory page M 554 may include the data "ORS" 566, the second VM memory page T 556 may include data "XYZ" 568, and the third VM memory page C 560 may include data "HIJ" 570. As a result, the scanning module 344 scans memory pages that have a higher likelihood of being duplicate memory pages before scanning memory pages that have a lower likelihood of being duplicate memory pages. As explained previously, if the scanning module 344 determines that the first VM memory page A 552, the second VM memory page G 558, and the third VM memory page K 562 are duplicate memory pages, the deduplication module 348 may perform a deduplication process on these memory pages. As a result, after all the memory pages in the queue 550 have been scanned, the memory 118 may simply store a single memory page with the data "ABC" 564. The data "ABC" 564 may then be shared across the applications running the various virtual machines that require this data.

Figure 6:
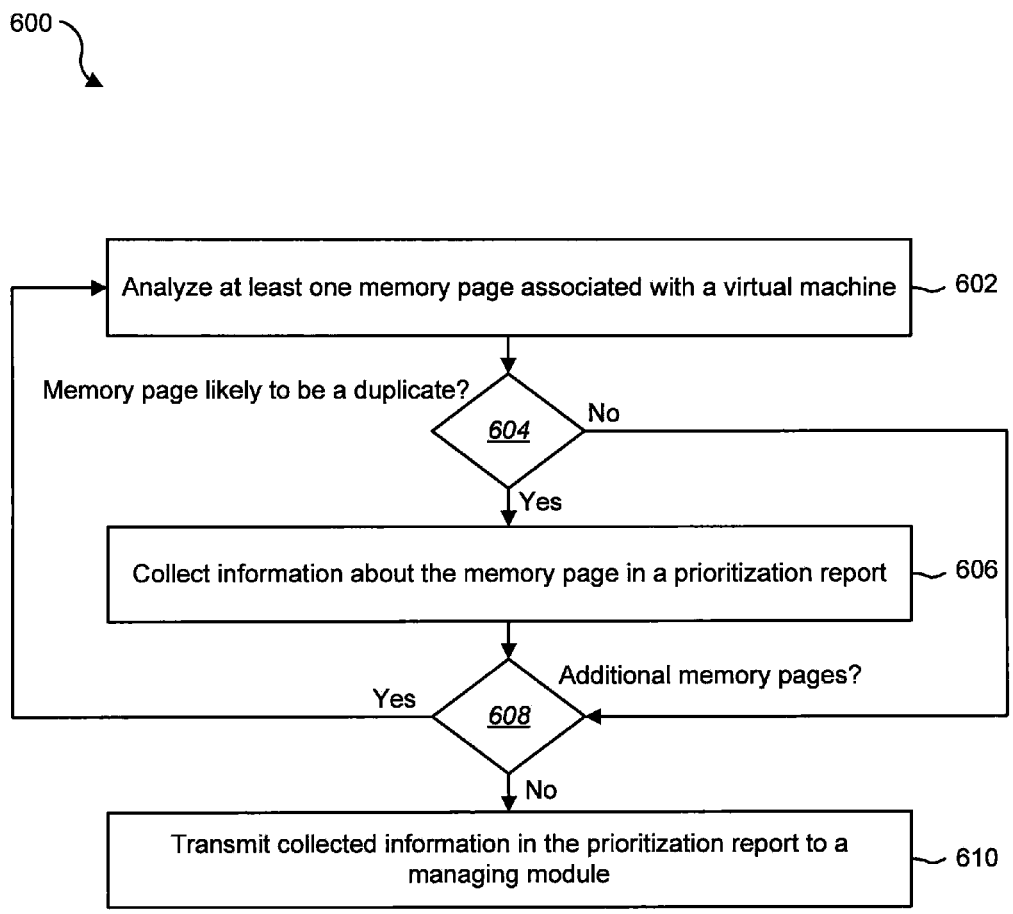
FIG. 6 is a flow diagram illustrating one embodiment of the method for identifying memory pages in a virtual environment that may be duplicate memory pages.

FIG. 6 is a flow diagram illustrating one embodiment of the method 600 for identifying memory pages in a virtual environment that may be duplicate memory pages. In one embodiment, the method 600 may be implemented by the indicating application 110.

In one configuration, at least one memory page associated with a VM may be analyzed 602. A determination 604 may be made as to whether the analyzed memory page is likely to be a duplicate memory page. If it is determined 604 that the memory page is not likely to be a duplicate memory page, a determination 608 may be made as to whether additional memory pages exist that are associated with the VM. If it is determined 608 that additional memory pages exist, the method 600 may return to analyze the additional memory pages associated with the VM. If, however, it is determined 604 that the memory page is likely to be a duplicate memory page, information about the memory page may be collected 606 in a prioritization report. The determination 608 may then be made as to whether additional memory pages exist. As previously explained, if it is determined 608 that additional memory pages do exist, the method 600 may return to analyze the additional memory pages associated with the VM. If, however, it is determined 608 that additional memory pages do not exist, the collected information in the prioritization report may be transmitted 610 to the managing module 112.

Figure 7:
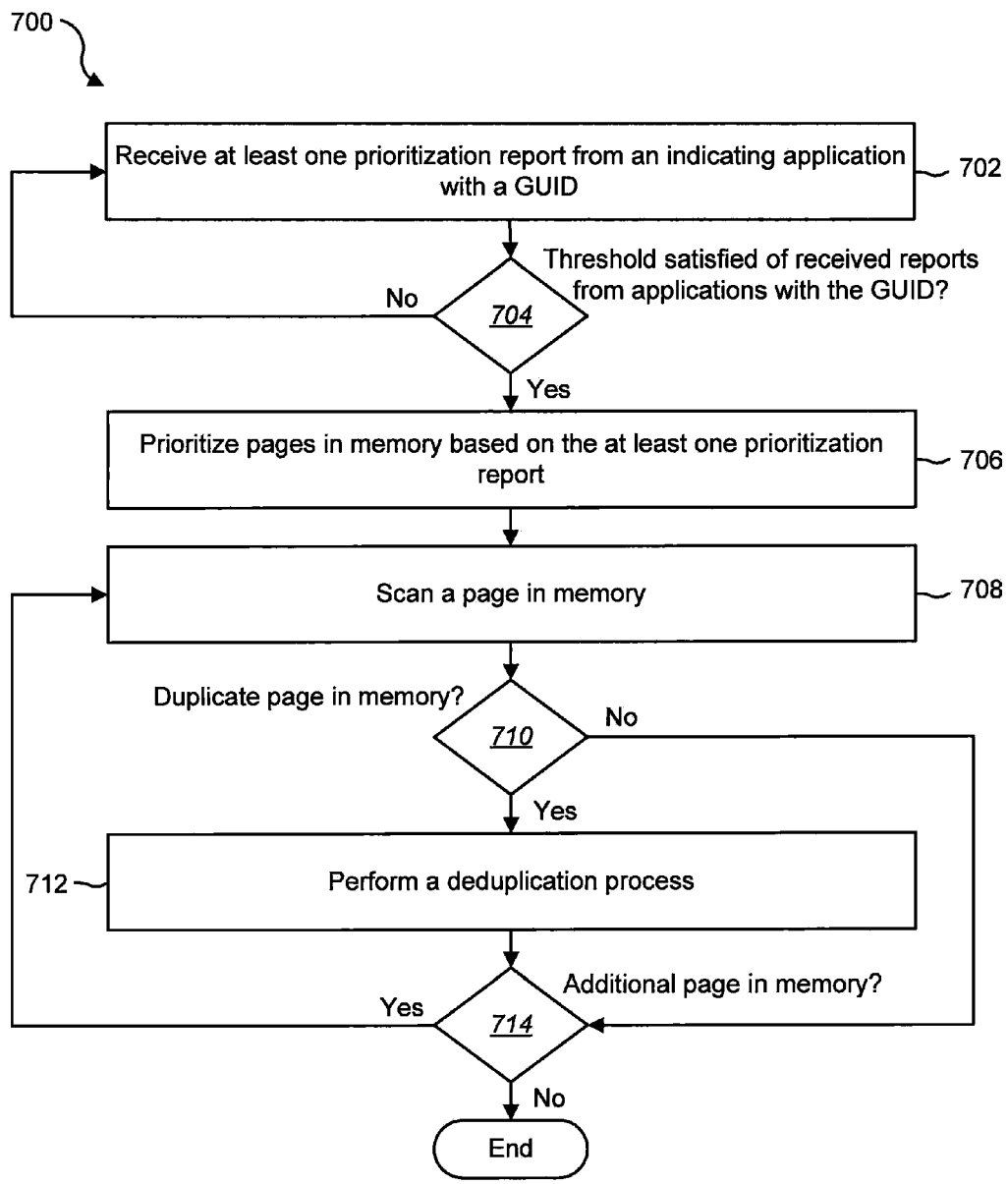
FIG. 7 is a flow diagram illustrating one embodiment of a method for prioritizing memory pages in a memory queue according to a report received from an indicating application operating in a virtual machine.

FIG. 7 is a flow diagram illustrating one embodiment of a method 700 for prioritizing memory pages in a memory queue according to a report received from an indicating application operating in a VM. In one embodiment, the method 700 may be implemented by the managing module 112.

In one configuration, at least one prioritization report may be received 702 from an indicating application. The indicating application may be associated with a GUID. A determination 704 may be made as to whether a threshold of received reports from indicating applications with the GUID has been satisfied. In other words, the managing module 112 may determine 704 whether a particular threshold number of reports that identify particular memory pages as having a high likelihood of being duplicate memory pages has been received from a threshold number of indicating applications with the same GUID. If it is determined 704 that the threshold is not satisfied, the method 700 may return to receive additional prioritization reports from the indicating application. If, however, it is determined 704 that the threshold is satisfied, pages in memory may be prioritized 706 based on the at least one prioritization report. The prioritization may indicate the order in which the pages in memory are scanned for deduplication analysis. In one embodiment, a page in memory may be scanned 708. The page that is selected to be scanned may be determined based upon the prioritization report. In one configuration, it may be determined 710 whether the scanned page is a duplicate of another page stored in memory. If it is determined 710 that the page is a duplicate memory page, a deduplication process may be performed 712 on the scanned page. A determination 714 may then be made whether additional pages in memory exist. If it is determined 714 that additional pages in memory do exist, the method 700 may return to scan an additional page in memory. If, however, it is determined 714 that additional pages in memory do not exist, the method 714 may end.

Figure 8:
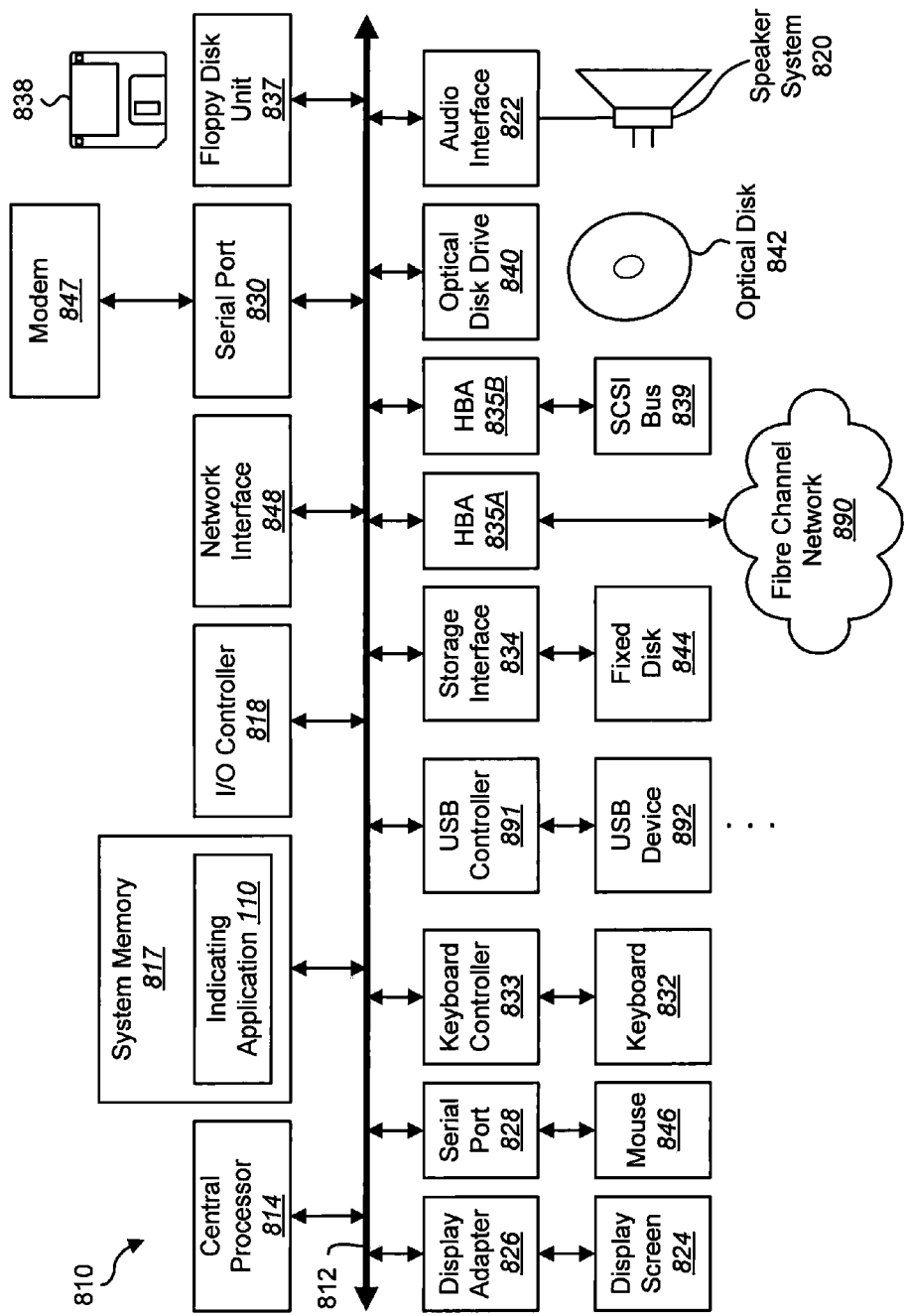
FIG. 8 depicts a block diagram of a computer system suitable for implementing the present systems and methods.

FIG. 8 depicts a block diagram of a computer system 810 suitable for implementing the present systems and methods. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), multiple USB devices 892 (interfaced with a USB controller 891), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the indicating application 110 to implement the present systems and methods may be stored within the system memory 817. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present systems and methods. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable medium such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
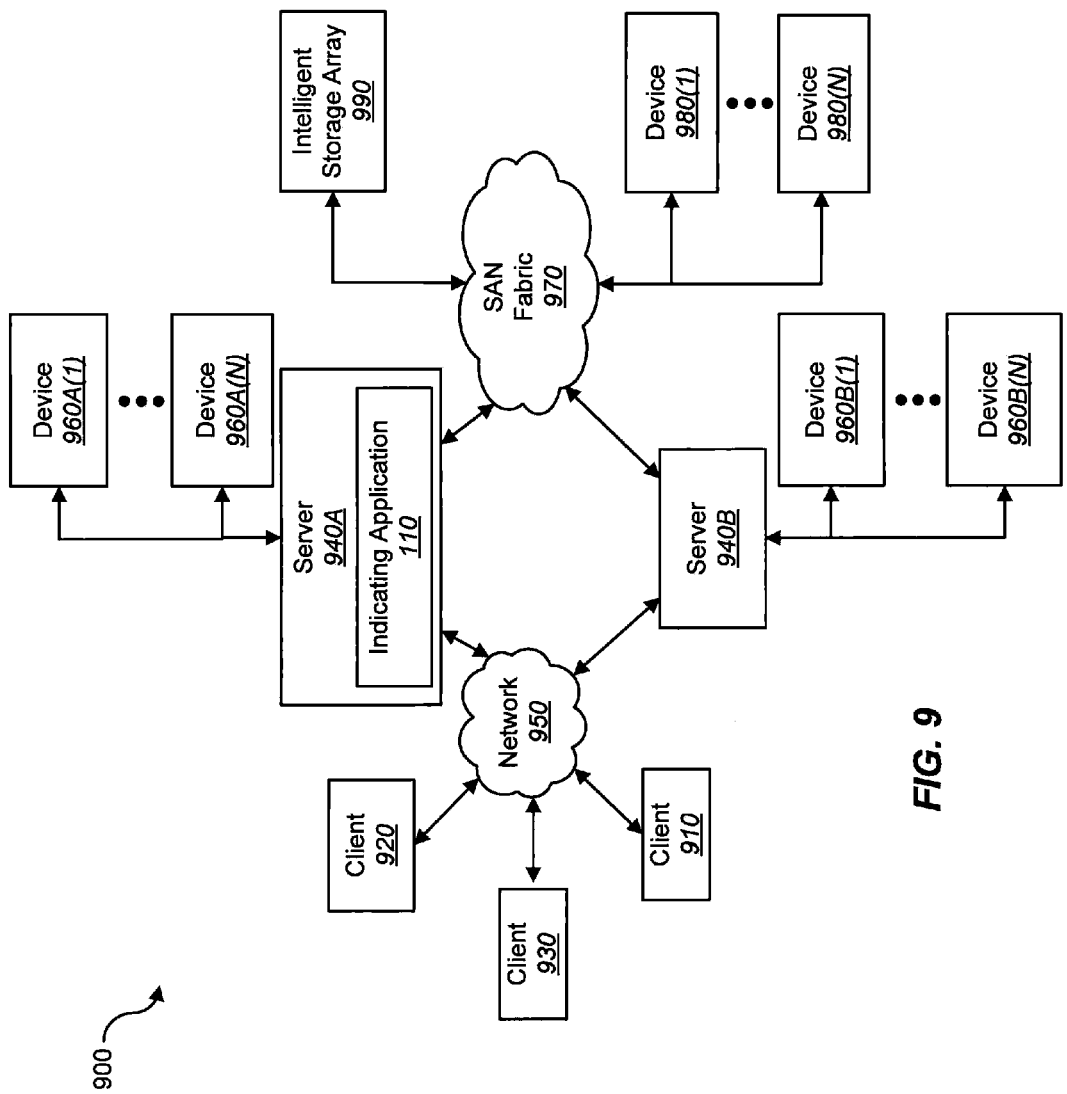
FIG. 9 is a block diagram depicting a network architecture in which client systems, as well as storage servers (any of which can be implemented using computer system), are coupled to a network.

FIG. 9 is a block diagram depicting a network architecture 900 in which client systems 910, 920 and 930, as well as storage servers 940A and 940B (any of which can be implemented using computer system 910), are coupled to a network 950. In one embodiment, the indicating application 110 may be located within a server 940A, 940B to implement the present systems and methods. The storage server 940A is further depicted as having storage devices 960A(1)-(N) directly attached, and storage server 940B is depicted with storage devices 960B(1)-(N) directly attached. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920, and 930 to network 950. Client systems 910, 920, and 930 are able to access information on storage server 940A or 940B using, for example, a web browser or other client software (not shown). Such a client allows client systems 910, 920, and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to identify candidate duplicate memory pages in a virtual environment, comprising:

analyzing at least one memory page in memory, wherein the at least one memory page is associated with an application executing in a virtual machine;

collecting information for the at least one memory page in memory when the at least one memory page is identified as being a candidate duplicate memory page, wherein the information identifies the application associated with the at least one memory page;

generating a report that includes the collected information for the at least one memory page and information for at least one additional memory page logged by one or more additional entities;

accessing the logged information to determine whether the one or more additional entities have identified an identical type of memory page as being a candidate duplicate memory page;

populating a memory page queue with a plurality of candidate duplicate memory pages, the memory page queue including the at least one memory page and the at least one additional memory page; and upon determining that the one or more additional entities have identified an identical type of memory page as a candidate duplicate memory page, prioritizing an order of the plurality of candidate duplicate memory pages within the memory page queue, wherein the order of the plurality of candidate duplicate memory pages is based on the logged information in the report, and wherein prioritizing the order of the plurality of candidate duplicate memory pages includes placing a set of matching candidate memory pages ahead of one or more non-matching candidate memory pages in the memory queue; and scanning the plurality of candidate duplicate memory pages in the memory page queue according to the prioritized order of the memory pages.

2. The method of claim 1, further comprising transmitting the report to a virtual machine monitor configured to manage at least one resource of a computing device for one or more virtual machines executing on the computing device.

3. The method of claim 1, further comprising performing deduplication techniques when a scanned memory page is a duplicate memory page.

4. The method of claim 1, wherein the report comprises a globally unique identifier (GUID) that identifies an entity that generated the report.

5. The method of claim 4, further comprising determining whether a threshold quantity of reports that identify the application associated with a candidate duplicate memory page have been received from a threshold number of entities with the GUID.

6. The method of claim 1, further comprising tagging a memory page when the memory page is a candidate duplicate memory page.

7. A computing device configured to identify candidate duplicate memory pages in a virtual environment, comprising:

a processor;

memory in electronic communication with the processor;

instructions being stored in the memory and being executable by the processor to:

analyze at least one memory page in memory, wherein the at least one memory page is associated with an application executing in a virtual machine;

collect information for the at least one memory page in memory when the at least one memory page is identified as being a candidate duplicate memory page, wherein the information identifies the application associated with the at least one memory page;

generate a report that includes the collected information for the at least one memory page and information for at least one additional memory page logged by one or more additional entities;

access the logged information to determine whether the one or more additional entities have identified an identical type of memory page as being a candidate duplicate memory page;

populate a memory page queue with a plurality of candidate duplicate memory pages, the memory page queue including the at least one memory page and the at least one additional memory page;

upon determining that the one or more additional entities have identified an identical type of memory page as a candidate duplicate memory page, prioritize an order of the plurality of candidate duplicate memory pages within the memory page queue, wherein the order of the plurality of candidate duplicate memory pages is based on the logged information in the report, and wherein prioritizing the order of the plurality of candidate duplicate memory pages includes placing a set of matching candidate memory pages ahead of one or more non-matching candidate memory pages in the memory queue; and scan the plurality of candidate duplicate memory pages in the memory page queue according to the prioritized order of the memory pages.

8. The computing device of claim 7, wherein the instructions being executable by the processor to:

transmit the report to a virtual machine monitor, wherein the virtual machine monitor is configured to manage at least one resource of the computing device for one or more virtual machines executing on the computing device.

9. The computing device of claim 7, wherein the instructions being executable by the processor to:

perform deduplication techniques when a scanned memory page is a duplicate memory page.

10. The computing device of claim 7, wherein the report comprises a globally unique identifier (GUID) that identifies the indicating application that generated the report.

11. The computing device of claim 10, wherein the instructions being executable by the processor to:

determine whether a threshold quantity of reports that identify the application associated with a candidate duplicate memory page have been received from a threshold number of indicating applications with the GUID.

12. The computing device of claim 7, wherein the instructions being executable by the processor to:

tag a memory page when the memory page is a candidate duplicate memory page.

13. A computer-program product to identify candidate duplicate memory pages in a virtual environment, the computer-program product comprising a non-transitory computer-readable medium storing instructions thereon, the instructions being executable by a processor to:

analyze at least one memory page in memory, wherein the at least one memory page is associated with an application executing in a virtual machine;

collect information for the at least one memory page in memory when the at least one memory page is identified as being a candidate duplicate memory page, wherein the information identifies the application associated with the at least one memory page;

generate a report that includes the collected information for the at least one memory page and information for at least one additional memory page logged by one or more additional entities;

access the logged information to determine whether the one or more additional entities have identified an identical type of memory page as being a candidate duplicate memory page;

populate a memory page queue with a plurality of candidate duplicate memory pages, the memory page queue including the at least one memory page and the at least one additional memory page;

upon determining that the one or more additional entities have identified an identical type of memory page as a candidate duplicate memory page, prioritize an order of the plurality of candidate duplicate memory pages within the memory page queue, wherein the order of the plurality of candidate duplicate memory pages is based on the logged information in the report, and wherein prioritizing the order of the plurality of candidate duplicate memory pages includes placing a set of matching candidate memory pages ahead of one or more non-matching candidate memory pages in the memory queue; and scan the plurality of candidate duplicate memory pages in the memory page queue according to the prioritized order of the memory pages.

14. The computer-program product of claim 13, wherein the instructions being executable by the processor to:

transmit the report to a virtual machine monitor configured to manage at least one resource of a computing device for one or more virtual machines executing on the computing device.

* * * * *